United States Patent
Hirata

(10) Patent No.: US 6,922,485 B2
(45) Date of Patent: Jul. 26, 2005

(54) METHOD OF IMAGE SEGMENTATION FOR OBJECT-BASED IMAGE RETRIEVAL

(75) Inventor: Kyoji Hirata, Kanagawa (JP)

(73) Assignee: NEC Corporation, Tokyo (JP)

(*) Notice: Subject to any disclaimer, the term of this patent is extended or adjusted under 35 U.S.C. 154(b) by 581 days.

(21) Appl. No.: 10/157,059

(22) Filed: May 30, 2002

(65) Prior Publication Data

US 2003/0108237 A1 Jun. 12, 2003

Related U.S. Application Data

(60) Provisional application No. 60/366,133, filed on Mar. 19, 2002.

(51) Int. Cl.$^7$ .............................. G06K 9/00; G06K 9/46; G06K 9/62

(52) U.S. Cl. ........................ 382/164; 382/190; 382/225

(58) Field of Search ............................... 382/162, 164, 382/165, 168, 172, 173, 190, 199, 224, 225, 251, 262, 272, 284, 305; 345/582, 592, 597; 358/512, 522, 529, 530

(56) References Cited

U.S. PATENT DOCUMENTS

| | | | | |
|---|---|---|---|---|
| 5,557,688 A | * | 9/1996 | Nakamura | 382/164 |
| 5,905,504 A | * | 5/1999 | Barkans et al. | 345/597 |
| 6,252,985 B1 | * | 6/2001 | Mitsunaga et al. | 382/199 |
| 6,512,846 B1 | * | 1/2003 | Luo | 382/165 |
| 6,608,929 B1 | * | 8/2003 | Shiratani | 382/173 |
| 6,674,907 B1 | * | 1/2004 | Shum et al. | 382/225 |
| 6,721,448 B2 | * | 4/2004 | Rao et al. | 382/164 |
| 6,778,698 B1 | * | 8/2004 | Prakash et al. | 382/164 |
| 6,795,576 B2 | * | 9/2004 | Uchida et al. | 382/164 |

OTHER PUBLICATIONS

J. Shi and J. Malik, *Normalized Cuts and Image Segmentation*, IEEE Transactions on Pattern Analysis and Machine Intelligence, 22(8), Aug. 2000, pp. 888–905.

W.Y. Ma and B.S. Manjunath, *Edge Flow: A Framework of Boundary Detection and Image Segmentation*, Proc. IEEE International Conference on Computer Vision and Pattern Recognition, Jun. 1997, pp. 744–749.

J.Z. Wang et al., *Unsupervised Multiresolution Segmentation Images with Low Depth of Field*, IEEE Trans. On Pattern Analysis and Machine Intelligence, Cot. 23, No. 1, Jan. 2001, pp. 85–90.

K. Hirata, S. Mukherjea, W.S. Li and Y, Hara, *Integrating Image Matching and Classification for Multimedia Retrieval on the Web*, IEEE International Conference on Multimedia Computing and Systems, Jun. 1999.

K. Hirata, S. Mukherjea, W.S. Li, Y. Okamura and Y. Hara, *Facilitating Object–based Navigation Through Multimedia Web Databases*, Theory and Practice of Object Systems, vol. 4(4), pp. 261–283 (1998).

* cited by examiner

Primary Examiner—Andrew W. Johns
Assistant Examiner—Amir Alavi
(74) Attorney, Agent, or Firm—Sughrue Mion, PLLC

(57) ABSTRACT

This paper provides a new image segmentation algorithm for object-based image retrieval. The system partitions multi-dimensional images into disjoint regions of coherent color and texture. In order to distinguish the object contour lines from texture edge, the description length of the line is used as discriminating criteria. Visual attribute values are assigned to each region.

45 Claims, 14 Drawing Sheets

Extract one block 8 X 8 pixels for a 640 X 480 image
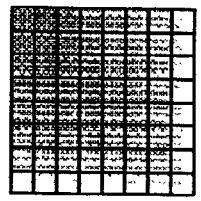
FIG. 2A
Create 2 X 2 image block
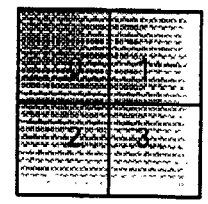
FIG. 2B
| 1 | -1 |
|---|---|
| 1 | -1 |
VERTICAL
FIG. 2C
| 1 | 1 |
|---|---|
| -1 | -1 |
HORIZONTAL
FIG. 2D
| $2^{0.5}$ | 0 |
|---|---|
| 0 | $-2^{0.5}$ |
DIAGONAL 45
FIG. 2E
| $2^{0.5}$ | 0 |
|---|---|
| 0 | $-2^{0.5}$ |
DIAGONAL 135
FIG. 2F
| 2 | -2 |
|---|---|
| -2 | 2 |
NON-DIRECTIONAL EDGE
FIG. 2G

RPB=1

RPB=2

RPB=3

LARGE COMPLEXITY

SMALL COMPLEXITY

EVALUATE THE DENSITY OF THE BOUNDARIES WITHIN THE LOCAL AREA

METHOD OF IMAGE SEGMENTATION FOR OBJECT-BASED IMAGE RETRIEVAL

CROSS-REFERENCES TO RELATED APPLICATIONS

This application is an application filed under 35 U.S.C. § 111(a), claiming benefit pursuant to 35 U.S.C. § 120 of the filing date of the Provisional Application Ser. No. 60/366,133 filed on Mar. 19, 2002, pursuant to 35 U.S.C. § 111(b). The Provisional Application Serial No. 60/366,133 is incorporated herein by reference for all it discloses.

BACKGROUND OF THE INVENTION

1. Technical Field of the Invention

This invention is related to a method for segmenting the color regions in an image for use in object-based image retrieval. More specifically, the invention partitions a multi-dimensional image into color regions, and color and border analysis is performed to segment the multi-dimensional image, or is performed to segment the multi-dimensional image into color regions.

2. Description of the Related Art

The following papers provide useful background information on the indicated topics, all of which relate to the invention, and are incorporated herein by reference:

J. Shi and J. Malik, *Normalized Cuts and Image Segmentation*, IEEE Transactions on Pattern Analysis and Machine Intelligence, 22(8), August 2000, pp. 888–905;

W. Y. Ma and B. S. Manjunath, *Edge Flow: A Framework of Boundary Detection and Image Segmentation*, Proc. IEEE International Conference on Computer Vision and Pattern Recognition, June 1997, pp. 744–49;

J. Z. Wang et al., *Unsupervised Multiresolution Segmentation of Images with Low Depth of Field*, IEEE Trans. On Pattern Analysis and Machine Intelligence, Cot. 23, No. 1, January 2001, pp. 85–90;

K. Hirata, S. Mukherjea, W. S. Li and Y. Hara, *Integrating Image Matching and Classification for Multimedia Retrieval on the Web*, IEEE International Conference on Multimedia Computing and Systems, June 1999;

K. Hirata, S. Mukherjea, W. S. Li, Y. Okamura and Y. Hara, *Facilitating Object-based Navigation Through Multimedia Web Databases*, Theory and Practice of Object Systems, Vol. 4(4), pp. 261–83 (1998).

There will now be provided a discussion of various topics to provide a proper foundation for understanding the invention.

Image retrieval is one of the key topics for the broadband Internet world. Computers store large amounts of video data and photographic data as stored image data. However, the stored image data is usually stored with no keywords or very few keywords. In addition, the stored image data is usually not categorized properly, since most users do not want to spend time classifying the stored image data or assign proper keywords to the stored image data.

In many cases, users want to use the objects contained in the stored image as the subject of a query. For example, a user may try to retrieve certain images that comprise the stored image data, i.e., "find all the pictures of my son on the beach." In this query, the location and size of the object in the stored image data is not important. All the stored images that include the user's son have to be retrieved. This kind of search is not achieved just by evaluating the similarity of the whole image. The system has to extract the requested objects from the image and evaluate the similarity using the object as a unit. For effective image retrieval, image segmentation and attribute assignment have to be designed for image matching purpose.

Segmentation is an operation of paramount importance in a number of image processing applications. Several techniques have been proposed. Malik et al. integrate the texture and contour cues and partition the image into the regions based on the normalized cut algorithms. W. Y. Ma et al. detect the boundary based on the edge flow. Ma et al. also integrate intensity/color and texture discontinuities and segment the image. These algorithms work to detect the boundary from the image, which includes both textured and non-textured area. However, they are not designed to segment images for object-based image retrieval. For example, although the shape of each object and localization have been taken into account when segmenting the image, it is not clearly considered in the indexing phase.

In partitioning images, J. Wang et al. apply an algorithm that uses a low depth of field. This algorithm works well to extract a clear foreground object. However, it is sometimes difficult to determine if the objects are placed in the foreground or the background of the stored image.

SUMMARY OF THE INVENTION

The invention has been made in view of the above circumstances and to overcome the above problems and limitations of the prior art.

A first aspect of the invention provides a method of segmenting a multi-dimensional image. The method comprises extracting color regions from the multi-dimensional image, and calculating complexities of the boundary between all the color region pairs. The method merges region pairs together if a boundary complexity value of the color region pair is above a predetermined boundary complexity threshold and the color distance between the region pair is less than a predetermined distance threshold value. Next, the method merges color regions together using hierarchical cluster analysis, and then merges color regions together using boundary analysis. The method then determines if a color region is small and surrounded by another color region. If that determination evaluates to true, the method then merges the small color region into the surrounding color region. Finally, the method assigns region data to each color region.

A second aspect of the invention provides a computer software product for segmenting a multi-dimensional image. The computer software product comprises software instructions that enable a computer to perform predetermined operations, and a computer readable medium bearing the software instructions. The predetermined operations comprise extracting color regions from the multi-dimensional image, and calculating complexities of the boundary between all the color region pairs. The predetermined operations merge region pairs together if a boundary complexity value of the color region pair is above a predetermined boundary complexity threshold and the color distance between the region pair is less than a predetermined distance threshold value. Next, the predetermined operations merge color regions together using hierarchical cluster analysis, and then merge color regions together using boundary analysis. The predetermined operations then determine if a color region is small and surrounded by another color region. If that determination evaluates to true, the predetermined operations then merge the small color region into the surrounding color region. Finally, the predetermined operations assign region data to each color region.

A third aspect of the invention provides a computer system for segmenting a multi-dimensional image. The computer system comprises a processor, and a memory that stores software instructions that are executed by the processor. The software instructions comprise extracting color regions from the multi-dimensional image, and calculating complexities of the boundary between all the color region pairs. The software instructions merge region pairs together if a boundary complexity value of the color region pair is above a predetermined boundary complexity threshold and the color distance between the region pair is less than a predetermined distance threshold value. Next, the software instructions merge color regions together using hierarchical cluster analysis, and then merge color regions together using boundary analysis. The software instructions then determine if a color region is small and surrounded by another color region. If that determination evaluates to true, the software instructions then merge the small color region into the surrounding color region. Finally, the software instructions assign region data to each color region.

BRIEF DESCRIPTION OF THE DRAWINGS

The accompanying drawings, which are incorporated in and constitute a part of this specification illustrate aspects of the invention and, together with the written description, serve to explain the aspects, advantages and principles of the invention. In the drawings.

FIGS. 2A–2G illustrates the edge histogram extraction process and filters used for the edge histogram extraction;

DETAILED DESCRIPTION OF THE INVENTION

Figure 1:
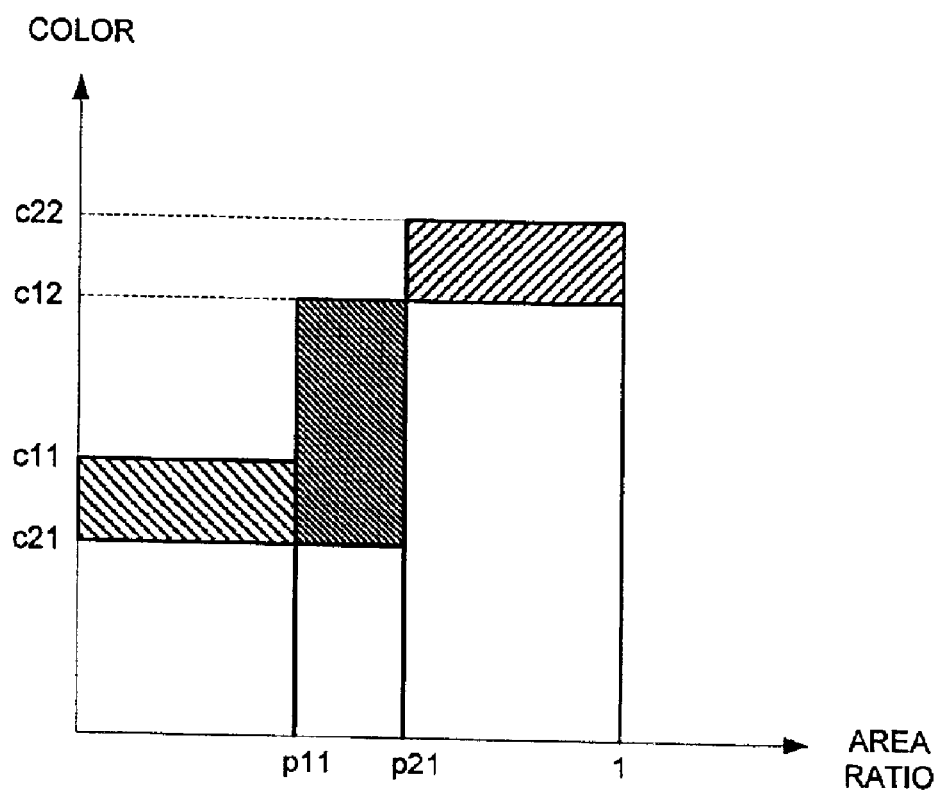
FIG. 1 illustrates the dominant color descriptor for the color distance between two color regions.

Prior to describing the aspects of the invention, some details concerning the prior art will be provided to facilitate the reader's understanding of the invention and to set forth the meaning of various terms.

As used herein, the term "computer system" encompasses the widest possible meaning and includes, but is not limited to, standalone processors, networked processors, mainframe processors, and processors in a client/server relationship. The term "computer system" is to be understood to include at least a memory and a processor. In general, the memory will store, at one time or another, at least portions of executable program code, and the processor will execute one or more of the instructions included in that executable program code.

It will be appreciated that the term "predetermined operations," the term "computer system software," and the term "executable code" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may include a diskette, a tape, a compact disc, an integrated circuit, a cartridge, a remote transmission via a communications circuit, or any other similar medium useable by computers. For example, to distribute computer system software, the supplier might provide a diskette or might transmit the instructions for performing predetermined operations in some form via satellite transmission, via a direct telephone link, or via the Internet.

Although computer system software might be "written on" a diskette, "stored in" an integrated circuit, or "carried over" a communications circuit, it will be appreciated that, for the purposes of this discussion, the computer usable medium will be referred to as "bearing" the instructions for performing predetermined operations. Thus, the term "bearing" is intended to encompass the above and equivalent ways in which instructions for performing predetermined operations are associated with a computer usable medium.

Therefore, for the sake of simplicity, the term "program product" is hereafter used to refer to a computer useable medium, as defined above, which bears instructions for performing predetermined operations in any form.

A detailed description of the aspects of the invention will now be given referring to the accompanying drawings.

There are several definitions in partitioning general images. The indexing and matching algorithms have to be adjusted for the image retrieval use. The following characteristics are specified for partitioning for object-based image retrieval. These specifications are for the object-based image retrieval; however, it is natural for the other types of applications.

1. Avoid having a large number of regions in one image. It is difficult and impractical to extract and manage all the objects contained in the image. The total number of the regions should not be large. When several small objects are in one image, some of them should be grouped based on the image composition.

2. Use simple descriptions for the extracted region. Since the extracted region is used as the retrieval query, the description of each region should be simple. For example, a complicated logo mark on a T-shirt should be treated with the T-shirt. On the other hand, the simple logo mark should be extracted by itself.

3. Extraction of the textured area General images include textured and non-textured regions. The system has to distinguish the object boundary from the edge based on the texture. Striped shirts, colored floors, zebra, etc. should be extracted within one region.

4. Grouping of the separated areas. In general images, objects overlap each other. Some objects might be separated into multiple areas. Each area does not represent the object by itself. Separated areas of the same object should be recognized as one object.

To perform the above requirement, the invention partitions multi-dimensional images into disjoint regions, and region-based image analysis is integrated with contour-based image analysis. The invention defines the distance among the units based on the color distribution, as well as texture coefficients and locations. The coherent area is extracted as regions by applying hierarchical cluster analysis. Through this process, the invention can group the separated area as the region. The invention can also partition the textured area into one region. On the other hand, the invention regards the boundary of region as the contour. The invention evaluates the complexity and density of the contours, and groups the regions accordingly. The invention can include the effect of the sharpness of the object and its composition into the segmentation result. Preferably, the invention uses the visual descriptors of MPEG-7 standard, which are modified to fit object matching.

Region-based image analysis and contour-based image analysis is a complementary approach. The invention processes regions with and without texture within the same framework. To distinguish the boundaries of the objects from the meaningless tangled web of contours, the invention evaluates the total description length of the color region. This is also effective to keep the description of the color region simple. For example, the complicated logo mark can be grouped with T-shirts through this type of analysis approach.

The invention assigns region data values to each region. The region data values can be keywords, a tag, an identifier name, etc. For example, a multi-dimensional image of a subway station could have regions that correspond to a subway car, and those regions could be assigned the keyword "train". The invention can also assign a visual feature indicator to the region as a region data value. The visual features have been selected mainly from MPEG-7 standard. Since the color regions have a variety of shapes and sizes, some of the visual features are modified to fit arbitrary shape and size.

The Dominant Color Descriptor (DCD) is described in the MPEG-7 XM 8.0 standard. Preferably, the number of colors in one region at most two, since the segmented region shows properties about color feature. Preferably, the invention uses one or two dominant colors and their percentage per each region. Since the invention uses at most two colors in one region, the invention uses different criteria from the criteria described in MPEG-7 XM 8.0 to calculate the distance between the color regions. The distance $DCD(R_1,R_2)$ between the region $R_1$ (Dominant Color 1: color c11, area ratio p11, Dominant Color 2: color c12, area ratio p12 (=1−p11)) and $R_2$ Dominant Color 1: color c21, area ratio p21, Dominant Color 2: color c22, area ratio p22 (=1−p21)) is defined by Equation (1):

$$DCD(R1, R2) = \min\begin{pmatrix} c\_d(c11, c12, c21, c22, p11, p12, p21, p22), \\ c\_d(c11, c12, c22, c21, p11, p12, p22, p21) \end{pmatrix} \quad \text{Eq. (1)}$$

In Equation (1), the function c_d( ) is defined as follows by Equation (2):

$$c\_d(a1,a2,a3,a4,p1, p2,p3,p4)=d(a1,a3)*\min(p1,p3)+d(a2,a4)*\min(p2,p4)+d(a2,a3)*\max(0,p3-p1)+d(a1,a4)*\max(0,p1-p3) \quad \text{Eq. (2)}$$

In Equation (2), the function d(cn, cm) is defined as the color distance between the color cn and the color cm on the CIE Luv color space. Referring to FIG. 1, the definition of the distance based on the dominant color is illustrated.

The Color Layout Descriptor (CLD) is described in the MPEG-7 XM8.0 standard. In order to apply to the arbitrary shape of the color region, the invention first calculates the average of the color region. The boundary box of the color region is extended to become a square, and non-region area is filled with the average color. After the filling process, the invention extracts the color layout descriptor. The invention applies the L2 norm of coefficients to calculate the similarity $CLD(R_1,R_2)$, where the L2 norm is based on the distance of the squares.

For the Shape Descriptor, the invention extends the boundary box of the color region to become a square block of pixels. The invention divides the image into 8×8 pixel blocks and counts the number of valid pixels within the pixel block. Next, the invention counts all pixels for each row and each column in order to get a 16-dimension feature vector, i.e., (number of the valid pixels)/(number of all pixels) for all rows and columns. The values of the feature vector are normalized to [0–255]. To calculate the similarity distance, the invention applies L1 norm of each value, wherein the Li norm is the distance based on the absolute values.

The Edge Histogram Descriptor is described in the MPEG-7 XM 7.0 standard. The invention calculates edge histogram values based on the methods described in MPEG-7 XM 7.0 standard. The invention modifies the algorithm in order to fit the arbitrary shape of the color region. Referring to FIGS. 2A–2F, the results of the algorithm to extract the edge histogram is illustrated. First, the algorithm extracts a pixel block from the input image whose size is 8×8 pixels. Next, the algorithm calculates five edge strengths: es_vertical, es_horizontal, es_diagonal45, es_diagonal135 and es_nondirection. The algorithm next evaluates the edge histogram using Equation (3):

$$\max\begin{pmatrix} es\_vertical, es\_horizontal, es\_diagonal45, \\ es\_diagonal135, es\_nondirection \end{pmatrix} > Th \quad \text{Eq. (3)}$$

If Equation (3) evaluates to true, then the direction of the edge is counted. In other words, the total number of pixels on a particular edge is counted. If Equation (3) does not evaluate to true, then this pixel block does not have an edge and should not be counted. The edge strengths and edge histogram for all pixel blocks are calculated to extract a five-dimension edge histogram. To calculate the similarity distance, the invention uses the sum of L1 norm of each bin.

Usually texture should be evaluated using texture-stable area. Since the outside of the color region have a different type of the texture from the inside of the color region. In calculating the texture coefficients (e.g., wavelet coefficients), the effect of the boundary is usually included. To evaluate the texture inside the color region, the system has to remove the effect of the boundary area. Using the pixels, n-pixel depth from the boundary in calculating the texture coefficient is one of the way to reduce the effect of the boundary. In order to calculate wavelet coefficients, the invention applies an N-level wavelet transform to the stored image and gets 3×N coefficients for each pixel. In order to reduce the boundary effects, the invention does not use the edge part (i.e., below +4 pixel depth). Finally, the invention uses the L2 norm of vectors to calculate the similarity distance.

Figure 3:
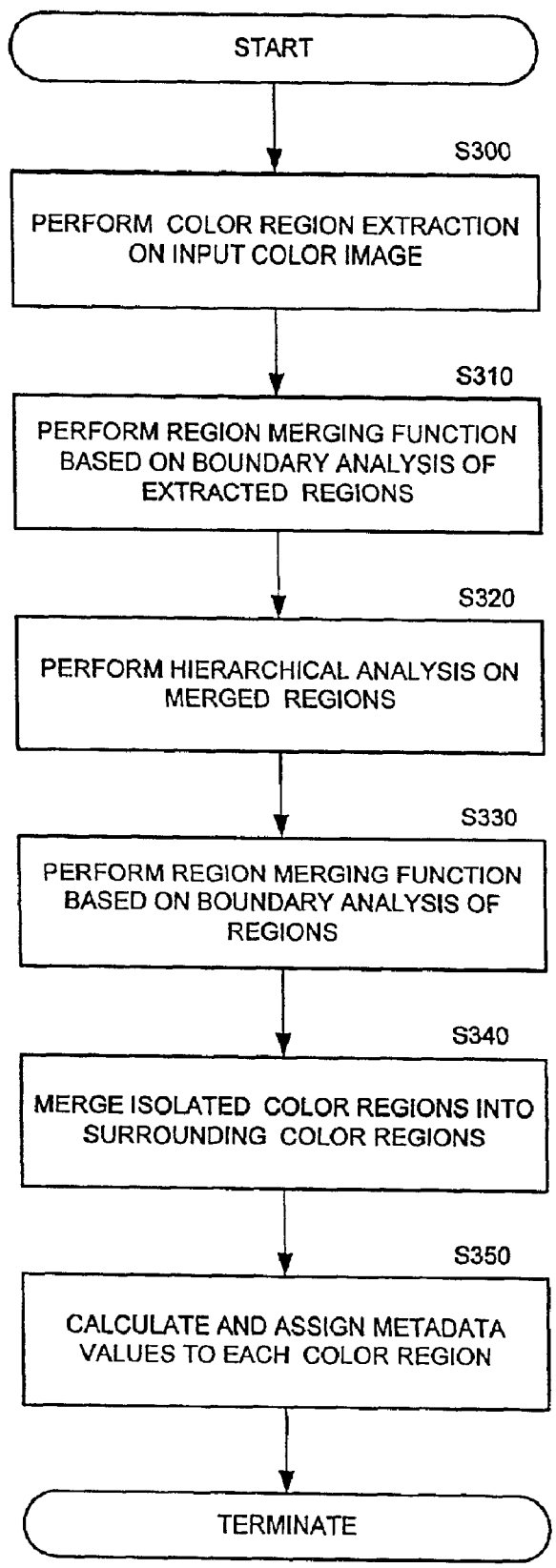
FIG. 3 illustrates an exemplary process flow of the invention.

Referring to FIG. 3, the invention is described in summary fashion. At S300, a region extraction is executed on an input image. Typically, the image is input as a Red-Blue-Green (RGB) intensity value matrix, but other types of image matrices can be used as well. The region extraction is based on the color values. At S310, a merge function based on a boundary analysis of the input image is performed. The merge function is based on the shape analysis of the boundary lines. At S320, the input image undergoes segmentation. The segmentation of the input image is based on a hierarchical cluster analysis. After the segmentation, at S330, the input image undergoes another merge function based on a boundary analysis. In this boundary analysis, the shape, density and energy of the boundary line descriptions are analyzed. Next, at S340, small isolated areas within the input image are merged. This merge function is based on the relationship of the small regions to larger color regions. Finally, at S350, visual features (e.g., dominant color, color layout, wavelet, edge histogram, shape) are calculated and assigned for each region of the input image.

The invention will now be described in greater detail. Preferably, the invention processes an image comprising a full-color original image, which is input as an RGB intensity value matrix. Yiq, CMY (cyan-magenta-yellow), satellite images, gray scale images or other multi-dimensional images can be used as well, by defining the color distance properly. For example, for gray scale images, the invention evaluates the brightness differences in order to evaluate the color distances.

Figure 4:
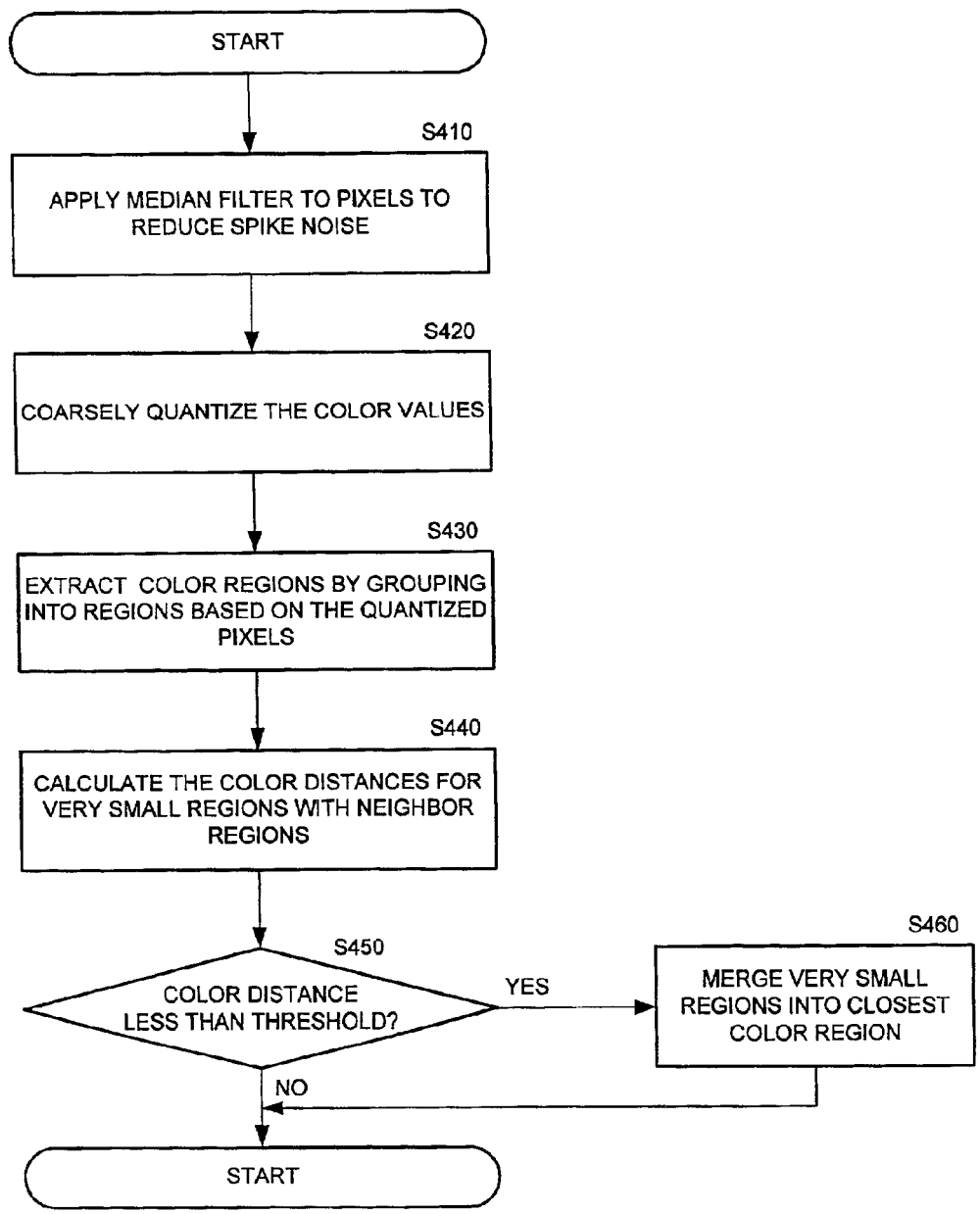
FIG. 4 illustrates an exemplary process flow for the extraction of color regions from an input image.

Referring to FIG. 4, the invention extracts color regions from the original input image. From the original input image, the invention extracts a set of color regions $Z_1$ by applying region-growing methods. First, a median filter is applied to reduce the effect of spike noise of the pixels. Preferably, the present invention applies a 2×2 median filter. The invention processes the half size of images compared with the original input image. Next, the color values are coarsely quantized. The quantization of the color values is performed without significantly degrading the color quality of the image. After the color value quantization, the color regions are extracted by applying region-growing methods. First, adjacent pixels are grouped into the regions based on the coarsely quantized color values. Typically, this grouping occurs in the over-segmented regions. If the color region is very small, calculate the color distances with the neighbor regions and merge the very small region into the closest region if the color distance is less than threshold value. Threshold values to determine the color distance and to judge the size of the regions are pre-defined beforehand. The threshold values can also be specified based on the distribution of the region size and color distribution. For example, 3-sigma from the average are determined to be small (sigma is the square root of the standard deviation).

Figure 5:
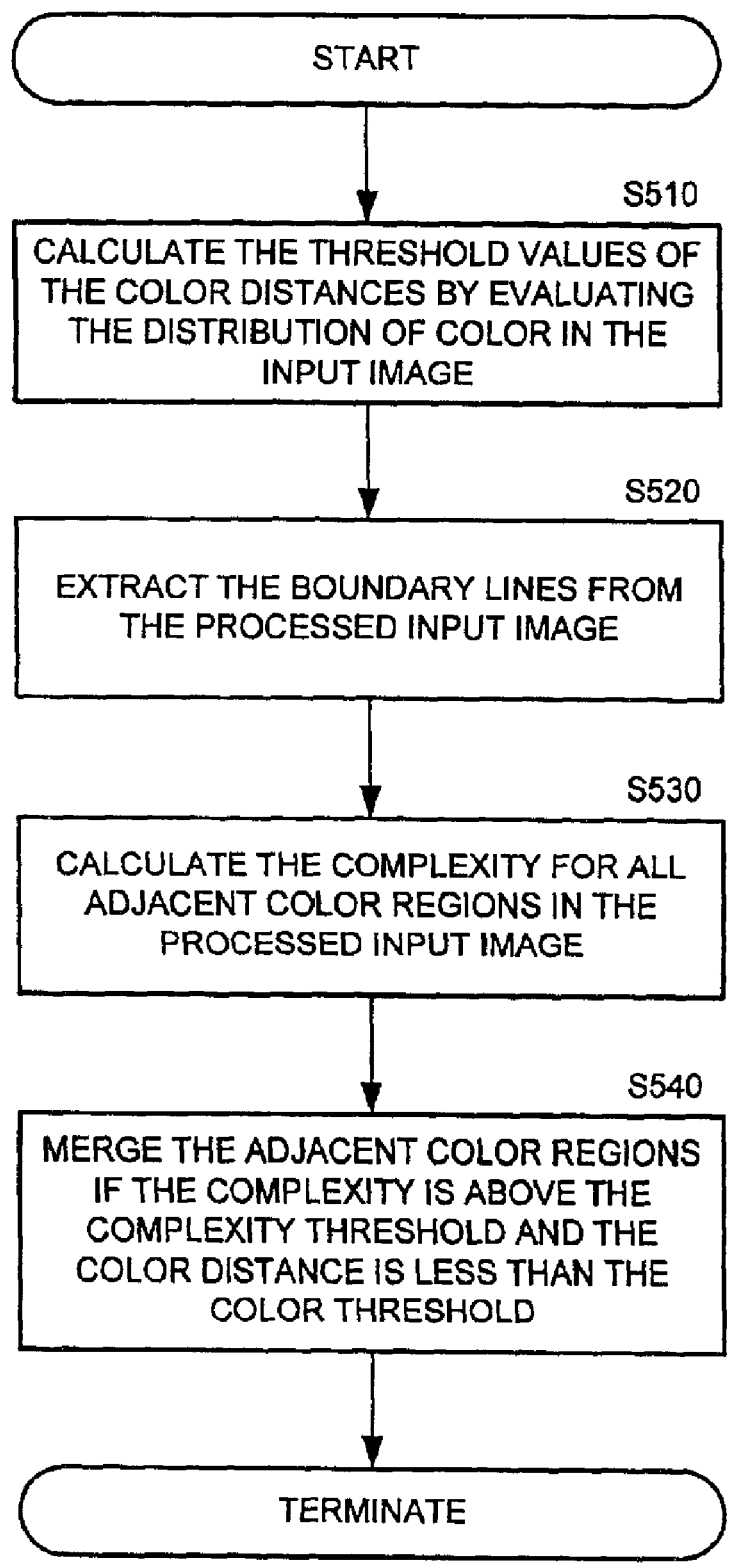
FIG. 5 illustrates an exemplary process flow for performing color region merging based on boundary analysis of the extracted color regions.

Referring to FIG. 5, after the extractions of the color regions, the color regions are merged based on boundary analysis. The complexities between all the possible region pairs are calculated and merged together into one region if the boundary of the region pair is complex enough and the color distance between these regions are less than the threshold values.

Figure 6A:
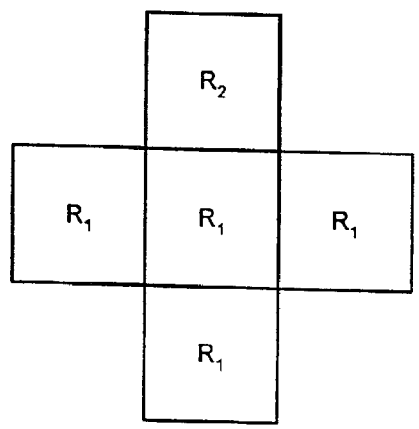
FIGS. 6A–6C illustrate various complexity values for two adjacent color regions.
Figure 6B:
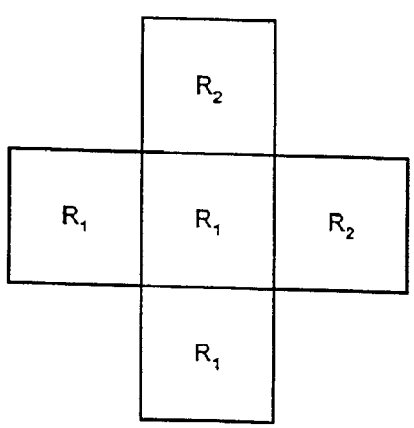
Figure 6C:
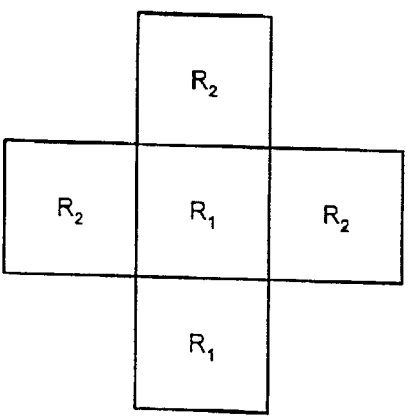

First, $Threshold_{color}$ is calculated. This is the threshold value of the color distance by evaluating the distribution of the color in the input image. For example, the invention evaluates all the distances of the neighborhood regions and calculates the average and standard deviation of the color distance. The invention specifies the threshold values by extracting the values, 2-sigma from the average. By doing this, the invention can specify the threshold values based on the distribution of the color. For images that include similar colors, smaller values are used for the threshold. For images that include a variety of colors, larger values are used for the threshold. Next, the boundary lines are extracted from the segmentation matrix $Z_1$ created earlier during the extraction of the color regions. The boundary lines are specified by tracing the edges of the color regions. After the boundary lines are extracted, the Complexity($R_1$, $R_2$) is calculated for all possible $R_1$, $R_2 \in Z_1$. FIGS. 6A–6C illustrates the definition of Complexity() as contemplated by the invention. When a boundary has several curved portions, the degree of complexity is high. When the boundary is simple, e.g., a straight line, the complexity degree is low. The invention calculates Complexity($R_1$, $R_2$), which represents the complexity between color region $R_1$ and color region $R_2$, and is based on the connectivity to the other region. The calculation of Complexity($R_1$, $R_2$) is set forth in Equation (4):

$$Complexity(R_1, R_2) = \left( \begin{array}{c} Complexity(R_1 \to R_2) + \\ Complexity(R_2 \to R_1) \end{array} \right) / 2 \qquad \text{Eq. (4)}$$

In Equation (4), the function Complexity($R_1 \to R_2$) is further defined by Equation (5):

$$Complexity(R_1 \to R_2) = BoundaryRnumber(R_1 \to R_2)/BoundaryNumber(R_1 \to R_2) \qquad \text{Eq.(5)}$$

In Equation (5), the function BoundaryNumber($R_1 \to R_2$) is the number of boundary pixels of color region $R_1$ that meet and/or adjacent to color region $R_2$. In Equation (5), the function BoundaryRnumber($R_1 \to R_2$) is the sum of the number of RPB($R_1 \to R_2$) of the boundary pixels of color region $R_1$. The function RPB($R_2 \to R_1$) is the number of the pixels of color region $R_2$, which is adjacent to color region $R_1$ on each boundary.

Figure 7A:
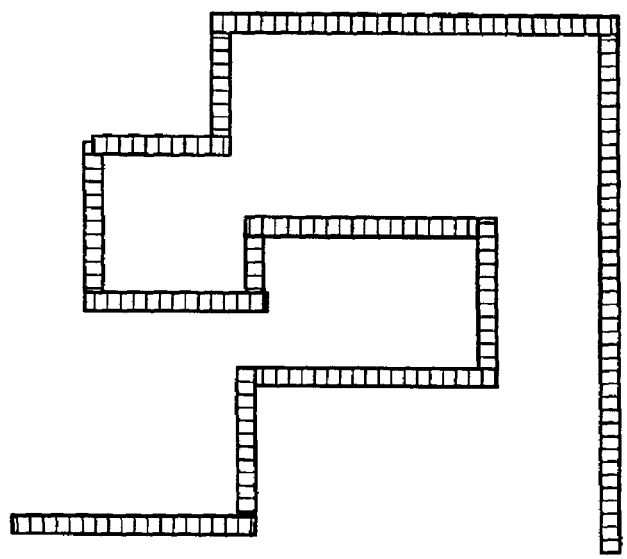
FIGS. 7A–7B illustrate simple and complex boundaries.
Figure 7B:
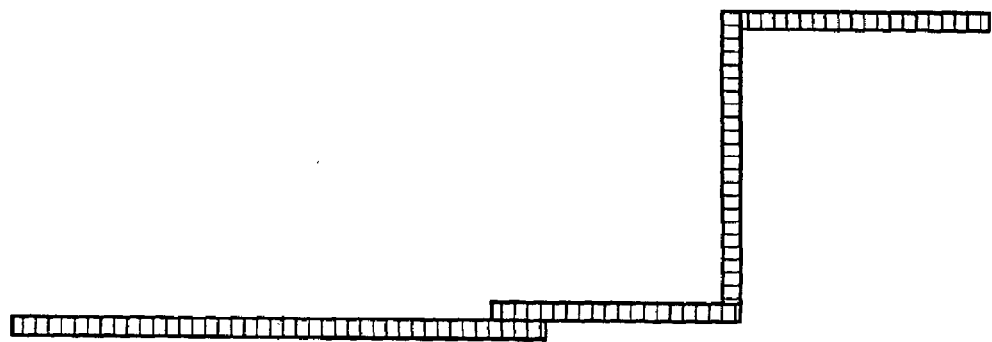

FIGS. 6A–6C shows the definition of RPB($R_1 \to R_2$). A shown in FIGS. 6A–6C, RPB($R_1 \to R_2$) is the same as the number of the boundary pixels only when all of the boundary is a straight line as shown in FIG. 6A. RPB($R_1 \to R_2$) is more than the number of the boundary pixels like FIG. 6B or 6C. Based on this RPB value, Complexity($R_1$, $R_2$) is calculated. The function Complexity($R_1$, $R_2$) returns large values when the boundary is complex. A complex boundary is illustrated in FIG. 7A. The function Complexity($R_1$, $R_2$) returns small values when the boundary is simple. A simple boundary is illustrated in FIG. 7B.

Next, color region $R_1$ and color region $R_2$ are merged together if Equation (6) evaluates to true. Otherwise, the color regions are not merged together.

$$Complex(R_1,R_2) > Thresholdd_{Complex} \text{ and } Distancec_{color}(R_1, R_2) < Threshold_{color} \qquad \text{Eq. (6)}$$

Typically, the value of $Threshold_{complex}$ is between 1 and 4. However, the value of $Threshold_{complex}$ can also be defined based on the average value and the standard deviation. The color regions in which the color values are gradually changing usually do not have sharp boundaries. After the merging of the color regions, the pseudo-boundaries in the image segmentation results are reduced, thereby producing a new segmentation matrix $Z_2$.

Figure 8:
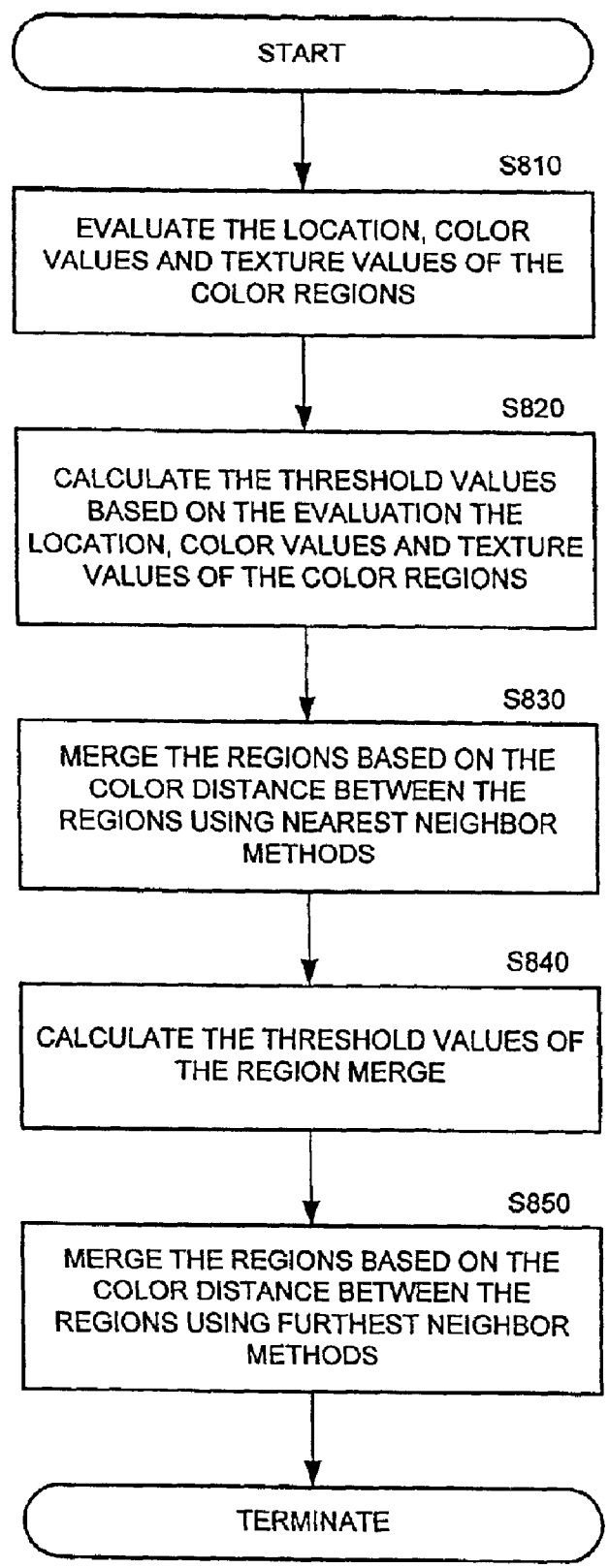
FIG. 8 illustrates an exemplary process flow for color region growing based on hierarchical analysis.

Referring to FIG. 8, the invention merges the color regions based on hierarchical cluster analysis. The threshold value to determine whether color regions are merged is calculated based on the distribution of the distance between the color regions. The invention uses the nearest neighbor method at first and then subsequently applies the furthest neighbor method. "Nearest neighbor" and "furthest neighbor" are known methods for categorizing data. To execute the methods, the system calculate the distance of all the pair of regions, and merge the regions from the closest pair until the number of the category or until all the distance between the regions are less than the threshold values. The difference is how to define the new distance among the new created region and other regions. In this method, separated regions can be merges as one region. The system calculates the distance of all possible pairs of the regions and executes the region merge. A new segmentation matrix $Z_3$ is produced from the old segmentation matrix $Z_2$. Some of the color regions in the new segmentation matrix $Z_3$ could have more than two segmented areas.

First, the $Distance_{region}(R_1, R_2)$ for all color regions $R_1$, $R_2 \in Z_2$ is calculated. In Equation (7), the location, color values and texture values of the color regions are evaluated.

$$Distance_{region}(R_1,R_2) = \alpha \cdot Distance_{location}(R_1,R_2) + \beta \cdot Distance_{color}(R_1,R_2) + \gamma \cdot Distance_{texture}(R_1,R_2) \quad \text{Eq.(7)}$$

Alpha ($\alpha$), beta ($\beta$) and gamma ($\gamma$) are used for the integration. These values can be specified beforehand, or these values are specified based on the comparison of the distribution of $Distance_{location}$, $Distance_{color}$ and $Distance_{texture}$. Equation (8) further defines the $Distance_{location}$ as used in Equation (7).

$$Distance_{location}(R_1,R_2) = ((Y_{R_2}/Y_{max} - Y_{R_1}/Y_{max})^2 + (X_{R_2}/X_{max} - X_{R_1}/X_{max})^2)^{0.5} \quad \text{Eq. (8)}$$

In Equation (8), the value $(X_{R1}, Y_{R1})$ defines the center of gravity of color region $R_1$ and the value $(X_{R2}, Y_{R2})$ defines the center of gravity of color region $R_2$. The value $(X_{max}, Y_{max})$ defines the size of the image. $Distance_{color}(R_1, R_2)$ defines the distance of the color values of the color region based on the Luv color space. $Distance_{texture}(R_1, R_2)$ defines the L2 norm of vectors based on the wavelet coefficient. A six-dimension feature vector is used, and the DC portion is not used. The average and standard deviation of valid pixel correspondent coefficient is used as well. As discussed above, the invention masks the edge part with +n pixels in depth to avoid boundary effects.

Next, the threshold values of the region merge Threshold_$NN_{region}$ are calculated, and this calculation is based on the distribution of $Distance_{region}$. The invention calculates all the $Distance_{region}$ and calculates the average and standard deviation of the $Distance_{region}$. For example, the Threshold_$NN_{region}$ value could be 2-sigma from the average.

Next, calculate the region feature distance between all pairs of color regions using Equation (7). The invention executes nearest neighbor methods based on the calculated region feature distance. The invention then merges the color regions of $Z_2$, until the region feature distance between all the pairs of color regions is less than Threshold_$N_{region}$. The new matrix is identified as $Z_{2-1}$. The invention calculates the new threshold value Threshold_$FN_{region}$ based on the region feature distance between all the color region pairs of $Z_{2-1}$ using Equation (7). For example, the threshold value could be approximately 1.5 sigma from the average. The invention executed furthest neighbor methods based on the calculated distance. The invention then merges color regions $Z_{2-1}$ until the distance between all of the color pairs is less than Threshold_$FN_{region}$. The new matrix is identified as $Z_3$.

Figure 9A:
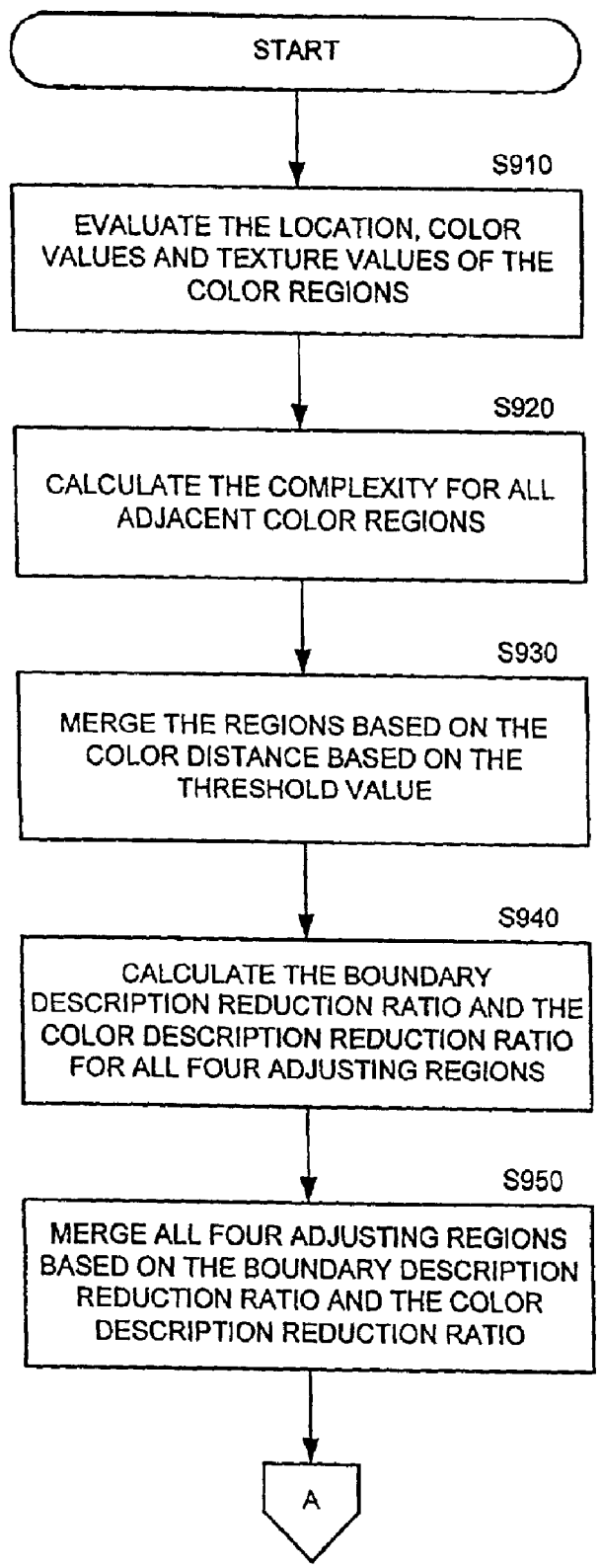
FIGS. 9A–9C illustrates an exemplary process flow for performing color region merging based on boundary analysis of the color regions.
Figure 9B:
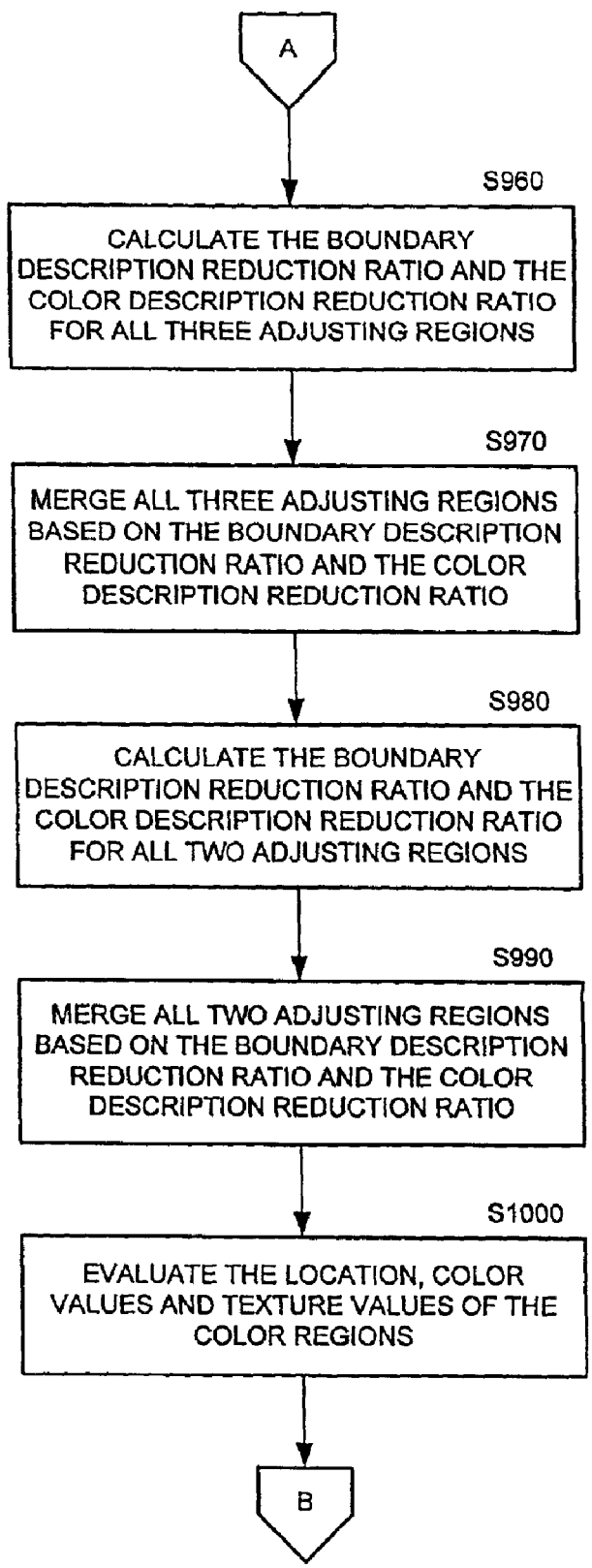
Figure 9C:
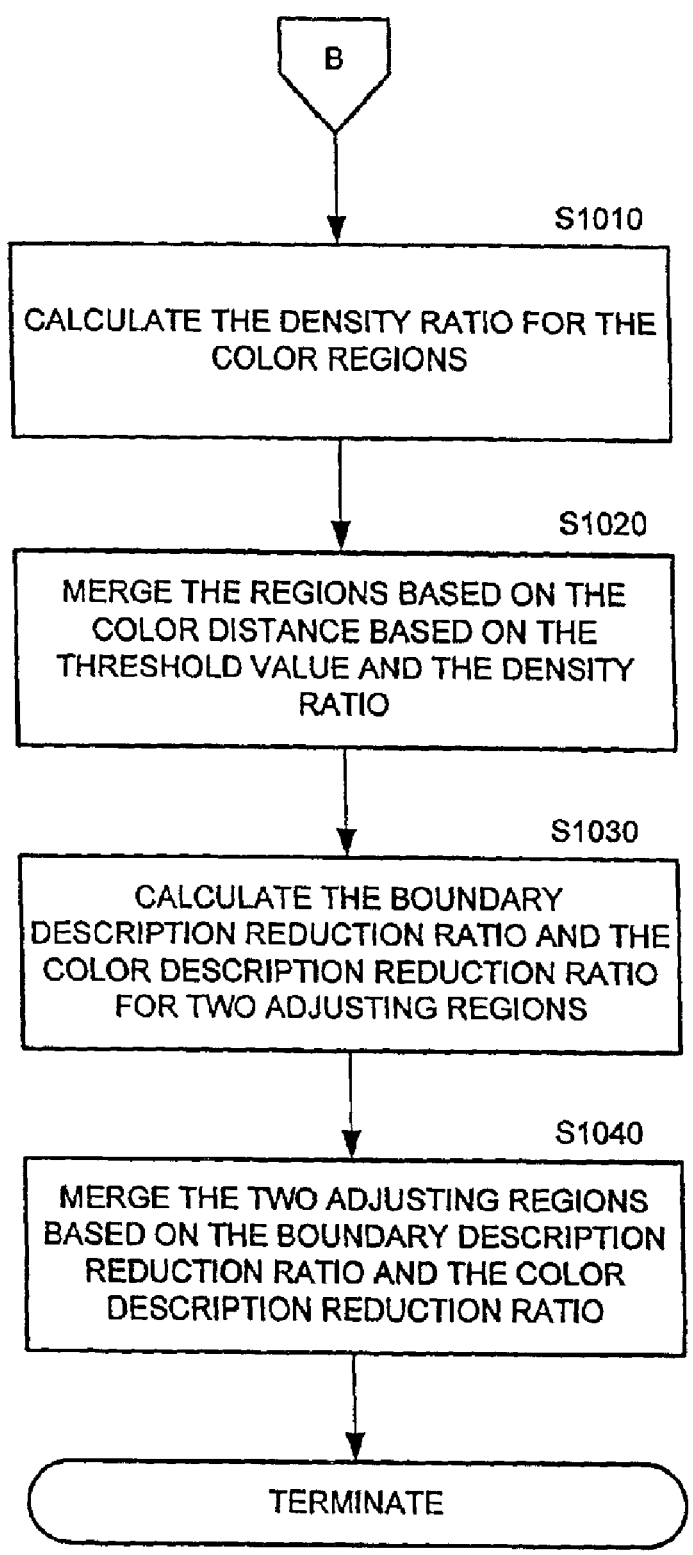

Referring to FIGS. 9A–9C, the invention performs a region merge on the segmentation matrix $Z_3$ based on boundary analysis. First, the $Distance_{region}(R_1, R_2)$ for all color regions $R_1$, $R_2 \in Z_3$ is calculated and the threshold value $Threshold_{region}$ for merging color regions is calculated as well. The invention then calculates $Complexity(R_1, R_2)$ for all possible color regions $R_1$, $R_2 \in Z_3$ and then merges color regions using the threshold value $Threshhold_{region}$. Thus, a new segmentation matrix $Z_{4-1}$ is produced.

Next, the invention calculates the boundary description reduction ratio $BDRR(R_1, R_2, R_3, R_4)$ and color description reduction ratio $CDRR(R_1, R_2, R_3, R_4)$ for all adjusting regions $R_1, R_2, R_3, R_4 \in Z_{4-1}$. Equation (9) illustrates the calculation of the boundary description reduction ratio:

$$BDRR(R_1,R_2,R_3,R_4) = (DLB(R_1+R_2+R_3+R_4))/(DLB(R_1)+DLB(R_2)+DLB(R_3)+DLB(R_4)) \quad \text{Eq. (9)}$$

Equation (10) illustrates the calculation of the color description reduction ratio:

$$CDRR(R_1, R_2, R_3, R_4) = \frac{CDL(R_1 + R_2 + R_3 + R_4)}{(CDL(R_1) + CDL(R_2) + CDL(R_3) + CDL(R_4))} \quad \text{Eq. (10)}$$

DLB represents the description length of the boundary. Currently, the invention uses the total boundary length. CDL represents the color description length. The invention uses the distribution of the color in the region.

The invention then merges color regions $R_1, R_2, R_3, R_4$ into one region if Equation (11) evaluates to true and the region feature distance is less than $Threshold_{region}$.

$$BDRR(R_1,R_2,R_3,R_4) + \alpha \cdot CDRR(R_1,R_2,R_3,R_4) < Threshold_{DESCRIPTION} \quad \text{Eq. (11)}$$

$Threshold_{region}$ can be predefined or it can be calculated from the distribution of the $Distance_{region}$ or it can be specified beforehand. The continuous color regions are the regions which are adjusting each other. For example, assume there are color regions A, B, C and D. Color region A should be adjusted with color regions B, C or D. Color region B should be adjusted with colors C, D or A. Color region C should be adjusted with color regions D, A or B. Color region D should be adjusted with color regions A, B or C. These are referred to as the adjusting regions, i.e., any color region has to be a neighbor with one of the other color regions. A new segmentation matrix $Z_{4-2}$ is generated as a result of the merging of the color regions.

Next, the invention calculates the boundary description reduction ratio $BDRR(R_1, R_2, R_3)$ and color description reduction ratio $CDRR(R_1, R_2, R_3)$ for all adjusting regions $R_1, R_2, R_3 \in Z_{4-2}$. Equation (12) illustrates the calculation of the boundary description reduction ratio:

$$BDRR(R_1,R_2,R_3) = (DLB(R_1+R_2+R_3))/(DLB(R_1)+DLB(R_2)+DLB(R_3)) \quad \text{Eq. (12)}$$

Equation (13) illustrates the calculation of the color description reduction ratio:

$$CDRR(R_1, R_2, R_3) = \frac{CDL(R_1 + R_2 + R_3)}{(CDL(R_1) + CDL(R_2) + CDL(R_3))} \quad \text{Eq. (13)}$$

DLB represents the description length of the boundary. Currently, the invention uses the total boundary length. CDL represents the color description length. The invention uses the distribution of the color in the region.

The invention then merges color regions $R_1, R_2, R_3$ into one region if Equation (14) evaluates to true and the region feature distance is less than $Threshold_{region}$:

$$BDRR(R_1,R_2,R_3) + \alpha \cdot CDR(R_1,R_2,R_3) < Threshold_{DESCRIPTION} \quad \text{Eq. (14)}$$

A new segmentation matrix $Z_{4-3}$ is generated as a result of the merging of the color regions.

Next, the invention calculates the boundary description reduction ratio $BDRR(R_1, R_2)$ and color description reduction ratio $CDRR(R_1, R_2)$ for all adjusting regions $R_1, R_2 \in Z_{4-3}$. Equation (15) illustrates the calculation of the boundary description reduction ratio:

$$BDRR(R_1,R_2)=(DLB(R_1+R_2))/(DLB(R_1)+DLB(R_2)) \quad \text{Eq.(15)}$$

Equation (16) illustrates the calculation of the color description reduction ratio:

$$CDRR(R_1, R_2) = \frac{CDL(R_1 + R_2)}{(CDL(R_1) + CDL(R_2))} \quad \text{Eq. (16)}$$

DLB represents the description length of the boundary. Currently, the invention uses the total boundary length. CDL represents the color description length. The invention uses the distribution of the color in the region.

The invention then merges color regions $R_1, R_2$ into one region if Equation (17) evaluates to true and the region feature distance is less than $Threshold_{region}$:

$$BDRR(R_1,R_2)+\alpha \cdot CDRR(R_1,R_2)<Threshold_{DESCRIPTION} \quad \text{Eq. (17)}$$

Figure 10:
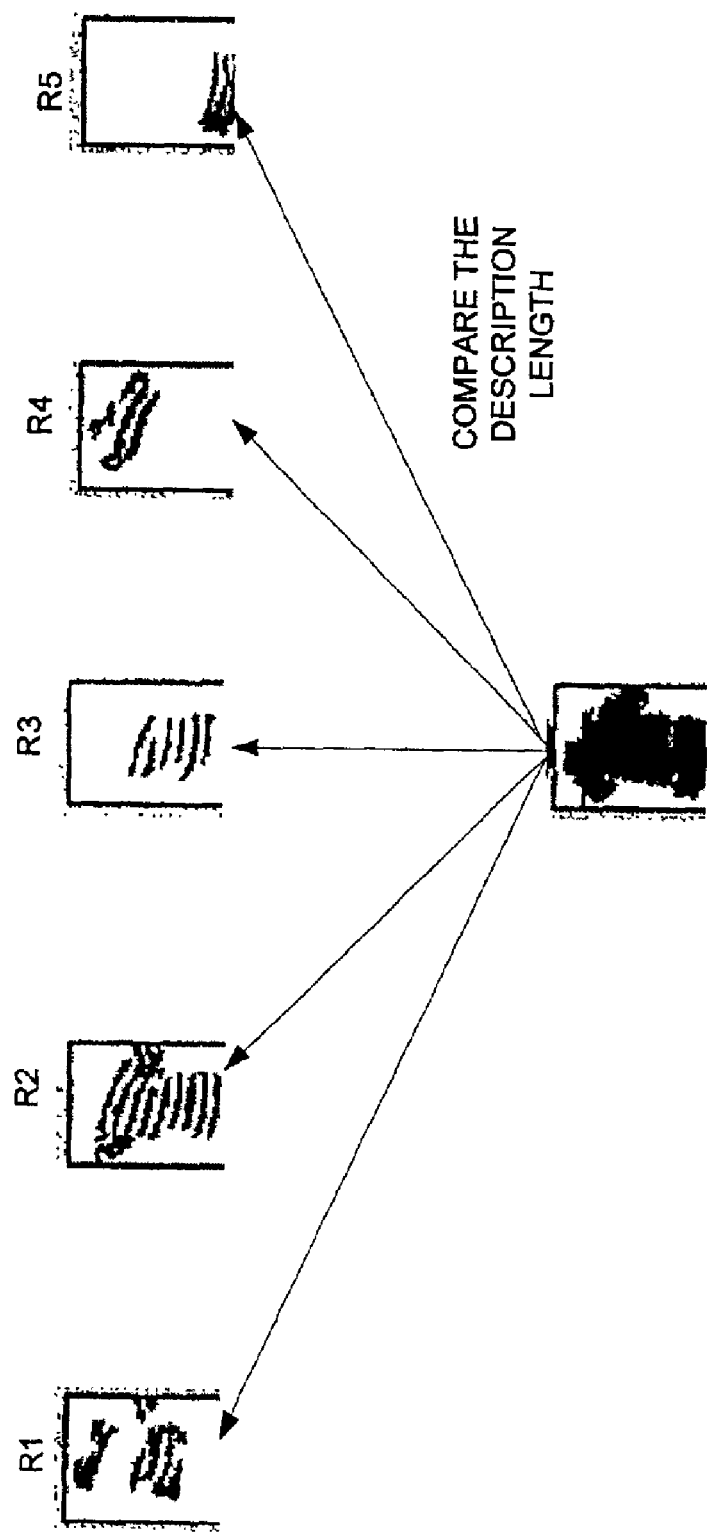
FIG. 10 illustrates the effect of color region merging based on boundary analysis of the color regions.

A new segmentation matrix $Z_{4-4}$ is generated as a result of the merging of the color regions. Because of the color region merges, the invention merges the textured area into one region as shown in FIG. 10. Next, the invention then calculates $Distance_{region}(R_1, R_2)$ for all color regions $R_1, R_2 \in Z_{4-4}$ and also determines the threshold value $Threshold_{region}$ for merging color regions.

In Equation (18), the invention calculates the $DensityRatio(R_1, R_2)$ for all possible color regions $R_1, R_2 \in Z_{4-4}$.

$$DensityRatio(R_1,R_2))=(DensityRatio(R_1 \rightarrow R_2)+DensityRatio(R_2 \rightarrow R_1))/2 \quad \text{Eq. (18)}$$

The function $DensityRatio(R_1, R_2)$ is further defined by Equation (19):

$$DensityRatio(R_1 \rightarrow R_2)=HighdenseBNumber(R_1 \rightarrow R_2)/BoundaryNumber(R_1 \rightarrow R_2) \quad \text{Eq. (19)}$$

Figure 11B:
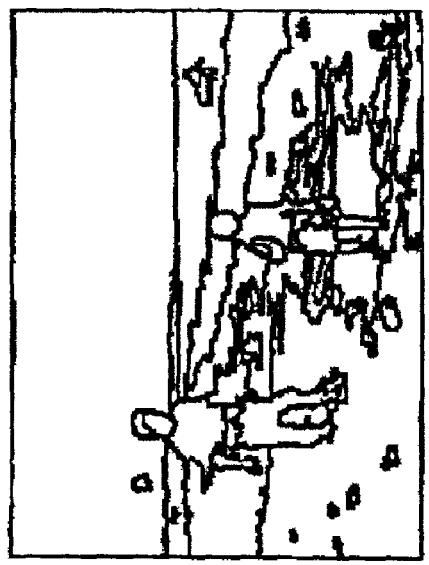
FIGS. 11A–11B illustrate the reduction of boundaries within an image after boundary density analysis.
Figure 11A:
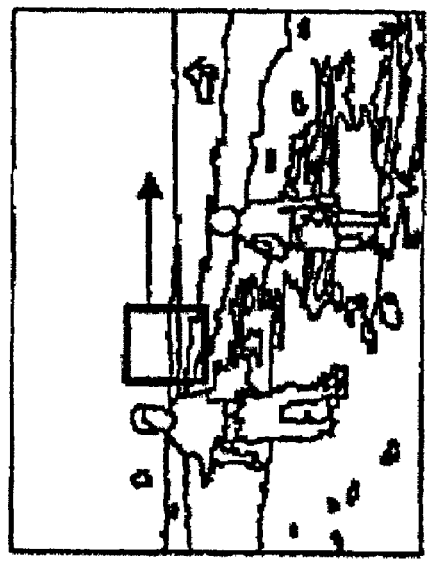

In Equation (19), the function $BoundaryNumber(R_1 \rightarrow R_2)$ is defined as the number of boundary pixels of color region $R_1$, which meet color region $R_2$. The function $HighdenseBNumber(R_1 \rightarrow R_2)$ is defined as the number of high density boundary pixels of color region $R_1$, which meet color region $R_2$. As shown in FIGS. 11A–11B, the high-density boundary pixels are boundary pixels in which the total number of boundary pixels in the local window surrounding the pixel is more than the threshold values.

The invention then merges color regions $R_1, R_2 \in Z_{4-4}$ if Equation (20) and Equation (21) evaluate to true:

$$DensityRatio(R_1,R_2)>Threshold_{density} \quad \text{Eq. (20)}$$

$$Distance_{region}(R_1,R_2)<Threshold_{region} \quad \text{Eq. (21)}$$

$Threshold_{density}$ can be specified by calculating the distribution of the boundary density or it can be specified beforehand. DensityRatio evaluates how crowded is the boundary area between the two specified regions. The boundary lines which exist in the boundary-crowded area, tend to be less important. The invention determines the boundary pixels in the boundary crowded area by calculating the number of the boundary pixels around the boundary pixel to be evaluated. The boundary between $R_1$ and $R_2$ is evaluated to determine how many pixels are boundary pixels in the boundary crowded area and the percentage of boundary pixels in the boundary crowded area from all the boundary pixels between $R_1$ and $R_2$. The merged color regions produce a new segmentation matrix $Z_{4-5}$.

The invention then calculates the boundary description reduction ratio $BDRR(R_1, R_2)$ and color description reduction ratio $CDRR(R_1, R_2)$ for all adjusting regions $R_1, R_2 \in Z_{4-5}$ based on Equation (15). The calculation of the color description reduction ratio is based on Equation (16). Again, DLB represents the description length of the boundary. Currently, the invention uses the total boundary length. CDL represents the color description length. The invention uses the distribution of the color in the region. The invention then merges color regions $R_1, R_2$ into one region if Equation (17) evaluates to true and the region feature distance is less than $Threshold_{region}$ and a new segmentation matrix $Z_{4-6}$ is generated as a result of the merging of the color regions.

Figure 12B:
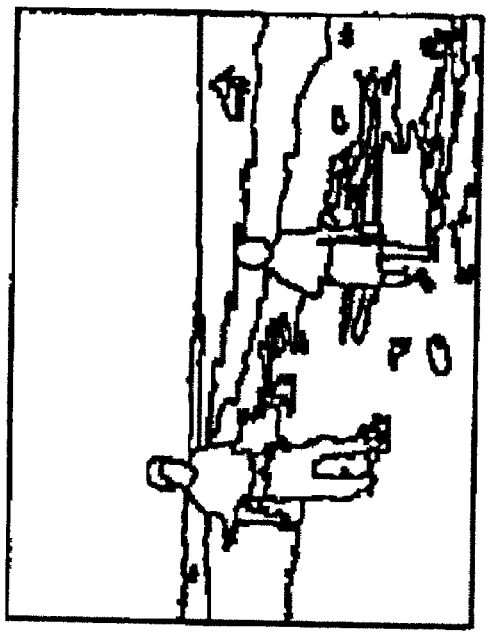
FIGS. 12A–12B illustrate the reduction of isolated small areas from an image.
Figure 12A:
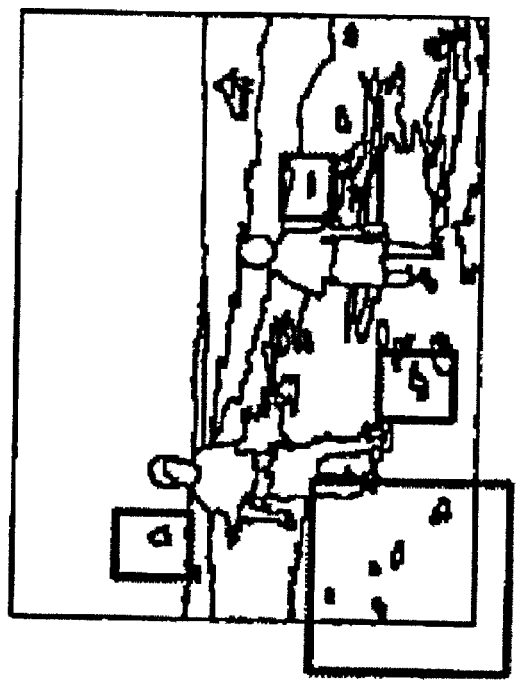

Referring to FIGS. 12A–12B, small isolated color regions are illustrated. The small color regions, surrounded by one color region, are merged into the surrounding color region. This generates a segmentation matrix $Z_5$ that is now ready to be used for object queries.

In another embodiment of the invention, a computer software product for segmenting a multi-dimensional image is provided. The computer software product comprises software instructions that enable a computer system to perform predetermined operations. The computer system could be a simple PC-compatible system, a computer network, or a multi-node distributed system. A computer readable medium bears the software instructions. The computer system will have a memory that can store the software instructions that are stored on the computer readable medium as well. The predetermined operations borne on the computer readable medium implement the invention as described in the preceding paragraphs. The predetermined operations comprise extracting color regions from a multi-dimensional image that is input into the computer system, and calculating complexities of the boundaries between all color region pairs. The predetermined operations then merge region pairs together if a boundary complexity value of the color region pair is above a predetermined boundary complexity threshold and the color distance between the region pair is less than a predetermined distance threshold value. Next, the predetermined operations cause the computer system to merge color regions together using hierarchical cluster analysis, and the color regions are further merged by the computer system using boundary analysis as described above. The predetermined operations will cause the computer system to determine if a color region is small and surrounded by another color region. If that determination is true, the predetermined operations cause the computer system to merge the small color region into the surrounding color region. Finally, region data to each color region are assigned as described above.

The foregoing description of the aspects of the present invention has been presented for purposes of illustration and description. Modifications and variations are possible in light of the above teachings or may be acquired from practice of the present invention. The principles of the present invention and its practical application were described in order to explain the to enable one skilled in the art to utilize the present invention in various embodiments and with various modifications as are suited to the particular use contemplated. Thus, while only certain aspects of the present invention have been specifically described herein, it will be apparent that numerous modifications may be made thereto without departing from the scope of the present invention. Further, acronyms are used merely to enhance the readability of the specification and claims, are not intended to lessen the generality of the terms used and should not be construed to restrict the claim scope to the embodiments described therein.

What is claimed is:

1. A method of segmenting a multi-dimensional image, wherein the method comprises:
   extracting color regions from the multi-dimensional image based on the color values of the pixels;
   calculating complexities of the boundary between all possible color region pairs, and merging region pairs together if a boundary complexity value of the color region pair is above a predetermined boundary complexity threshold and the color distance between the region pair is less than a predetermined distance threshold value;
   merging color regions together using hierarchical cluster analysis;
   merging color regions together using boundary analysis;
   determining if a color region is small and surrounded by another color region, and if that determination is true, merging the color region into the surrounding color region; and
   assigning region data to each color region.

2. The method as claimed in claim 1, wherein the extraction of color regions from the multi-dimensional image further comprises:
   applying a median filter to the multi-dimensional image to reduce pixel spike noise;
   quantizing the color values of the multi-dimensional image; and
   grouping adjacent pixels into color regions by grouping pixels together based on quantization values.

3. The method as recited in claim 2, wherein the size of the median filter is 2×2.

4. The method as recited in claim 2, wherein the grouping of pixels into color regions further comprises determining if a color region is small, and if that determination is true, merging the small color region with an adjacent color region closest in color value.

5. The method as recited in claim 1, wherein the calculation of complexities between color region pairs further comprises:
   extracting the boundary lines from the multi-dimensional image;
   counting the number of boundary pixels of the color region and the number of pixels in the color region immediately adjacent to the color region; and
   calculating a ratio based on the number of boundary pixels of the color region and the number of pixels in the color region immediately adjacent to the color region to determine the complexity between the color regions.

6. The method as recited in claim 1, wherein the merging color regions using hierarchical cluster analysis further comprises:
   calculating the features of each color region;
   calculate threshold values based on the feature calculation of the color regions;
   merge color regions based on the feature distance using a nearest neighbor analysis;
   calculate threshold values of the merged color regions; and
   merge color regions based on the feature distance using a furthest neighbor analysis.

7. The method as recited in claim 6, wherein the calculation of the features of each color region comprises calculating location, color values and texture values for each of the color regions.

8. The method as recited in claim 7, wherein the calculation of the location of the color regions comprises defining the center of gravity of the evaluated color regions and the size of the multi-dimensional image.

9. The method as recited in claim 7, wherein the color distance of the color regions is calculated using the Luv color space.

10. The method as recited in claim 7, wherein the calculation of the texture of the color regions comprises calculating average and standard deviations of the texture coefficients.

11. The method as recited in claim 10, wherein the calculation of the average and standard deviations use the coefficients of the pixels at a predefined depth from the region boundary.

12. The method as recited in claim 10, wherein the calculation of the texture distance of the color regions is calculated using the coefficient of the wavelet.

13. The method as recited in claim 12, wherein the calculation of the texture of the color regions comprises selecting the pixels at a predefined depth from the region boundary and calculate the average and standard deviation of the wavelet coefficient of the selected pixels.

14. The method as recited in claim 1, wherein the merging color regions together using boundary analysis further comprises merging color regions together using the complexity of adjacent color regions.

15. The method as recited in claim 1, wherein the merging color regions together using boundary analysis further comprises merging color regions together using the density of the color region boundary pixels.

16. The method as recited in claim 1, wherein the merging color regions together using boundary analysis further comprises merging color regions together using the description length of the color description and the boundary description.

17. The method as recited in claim 1, wherein the merging color regions together using boundary analysis further comprises:
   merging color regions together using the complexity of adjacent color regions;
   merging color regions together using the density of the color region boundary pixels; and
   merging color regions together using the description length of the color description and the boundary description.

18. The method as recited in claim 17, wherein the merging color regions together using boundary analysis further comprises:
   calculating the color description length and the boundary description length; and
   merging the color regions together in order to minimize the sum of the color description length and the boundary description length.

19. The method as recited in claim 17, wherein the merging color regions together using boundary analysis further comprises:
   calculating the boundary description reduction ratio and the color description reduction ratio; and
   merging the color regions together when the sum of the boundary description reduction ratio and the color description reduction ratio is less than a threshold value.

20. The method as recited in claim 1, wherein the merging color regions together using boundary analysis further comprises:
 calculating the location, color values and texture values of the color regions;
 calculating complexity values for all adjacent color regions;
 merging the color region based on the region distance and the threshold value;
 calculate the boundary description reduction ratio and the color description reduction ratio for four adjusting regions; and
 if the sum of the boundary description reduction ratio and the color description reduction ratio is less than a threshold value, merge the four adjusting regions.

21. The method as recited in claim 20, further comprising:
 after the merge of the four adjusting regions, calculate the boundary description reduction ratio and the color description reduction ratio for three adjusting regions; and
 if the sum of the boundary description reduction ratio and the color description reduction ratio is less than a threshold value, merge the three adjusting regions.

22. The method as recited in claim 21, further comprising:
 after the merge of the three adjusting regions, calculate the boundary description reduction ratio and the color description reduction ratio for two adjusting regions; and
 if the sum of the boundary description reduction ratio and the color description reduction ratio is less than a threshold value, merge the two adjusting regions.

23. The method as recited in claim 22, further comprising:
 after the merge of the two adjusting regions, calculate the density ratio for the color regions;
 merge adjacent color regions if the density ratio is greater than the density threshold;
 calculate the boundary description reduction ratio and the color description reduction ratio for two adjusting regions; and
 if the sum of the boundary description reduction ratio and the color description reduction ratio is less than a threshold value, merge the two adjusting regions.

24. The method as recited in claim 1, wherein assigning region data to each color region further comprises assigning visual features to each color region.

25. The method as recited in claim 24, wherein assigning visual features to each color region further comprises assigning a dominant color descriptor to each color region.

26. The method as recited in claim 24, wherein assigning visual features to each color region further comprises assigning a color layout descriptor to each color region.

27. The method as recited in claim 24, wherein assigning visual features to each color region further comprises assigning a shape descriptor to each color region.

28. The method as recited in claim 24, wherein assigning region data to each color region further comprises calculating an edge histogram descriptor for each color region.

29. The method as recited in claim 1, wherein assigning region data to each color region further comprises assigning at least one of a keyword, a tag or an identifier name to each color region.

30. A computer software product for segmenting a multi-dimensional image, wherein the computer software product comprises:
 software instructions that enable a computer to perform predetermined operations, and a computer readable medium bearing the software instructions, wherein the predetermined operations comprise:
 extracting color regions from the multi-dimensional image based on the color values of the pixels;
 calculating complexities of the boundary between all possible color region pairs, and merging region pairs together if a boundary complexity value of the color region pair is above a predetermined boundary complexity threshold and the color distance between the region pair is less than a predetermined distance threshold value;
 merging color regions together using hierarchical cluster analysis;
 merging color regions together using boundary analysis;
 determining if a color region is small and surrounded by another color region, and if that determination is true, merging the color region into the surrounding color region; and
 assigning region data to each color region.

31. The computer software product as claimed in claim 30, wherein the extraction of color regions from the multi-dimensional image further comprises:
 applying a median filter to the multi-dimensional image to reduce pixel spike noise;
 quantizing the color values of the multi-dimensional image; and
 grouping adjacent pixels into color regions by grouping pixels together based on quantization values.

32. The computer software product as claimed in claim 30, wherein the grouping of pixels into color regions further comprises determining if a color region is small, and if that determination is true, merging the small color region with an adjacent color region closest in color value.

33. The computer software product as claimed in claim 30, wherein the calculation of complexities between color region pairs further comprises:
 extracting the boundary lines from the multi-dimensional image;
 counting the number of boundary pixels of the color region and the number of pixels in the color region immediately adjacent to the color region; and
 calculating a ratio based on the number of boundary pixels of the color region and the number of pixels in the color region immediately adjacent to the color region to determine the complexity between the color regions.

34. The computer software product as claimed in claim 30, wherein the merging color regions using hierarchical cluster analysis further comprises:
 calculating the features of each color region;
 calculate threshold values based on the feature calculation of the color regions;
 merge color regions based on the region feature distance using a nearest neighbor analysis;
 calculate threshold values of the merged color regions; and
 merge color regions based on the region feature distance using a furthest neighbor analysis.

35. The computer software product as claimed in claim 30, wherein assigning region data to each color region further comprises assigning at least one visual feature to each color region.

36. The computer software product as claimed in claim 35, wherein assigning visual features to each color region further comprises assigning at least one of a dominant color descriptor, a color layout descriptor, a shape descriptor or an edge histogram descriptor for each color region.

37. The computer software product as claimed in claim 30, wherein assigning region data to each color region further comprises assigning at least one of a keyword, a tag or an identifier name to each color region.

38. A computer system for segmenting a multi-dimensional image, wherein the computer system comprises:

a processor; and a memory that stores software instructions that are executed by the processor, the software instructions comprising:

extracting color regions from the multi-dimensional image based on the color values of the pixels;

calculating complexities of the boundary between all possible color region pairs, and merging region pairs together if a boundary complexity value of the color region pair is above a predetermined boundary complexity threshold and the color distance between the region pair is less than a predetermined distance threshold value;

merging color regions together using hierarchical cluster analysis;

merging color regions together using boundary analysis;

determining if a color region is small and surrounded by another color region, and if that determination is true, merging the color region into the surrounding color region; and assigning region data to each color region.

39. The computer software product as claimed in claim 38, wherein the extraction of color regions from the multi-dimensional image further comprises:

applying a median filter to the multi-dimensional image to reduce pixel spike noise;

quantizing the color values of the multi-dimensional image; and grouping adjacent pixels into color regions by grouping pixels together based on quantization values.

40. The computer software product as claimed in claim 38, wherein the grouping of pixels into color regions further comprises determining if a color region is small, and if that determination is true, merging the small color region with an adjacent color region closest in color value.

41. The computer software product as claimed in claim 38, wherein the calculation of complexities between color region pairs further comprises:

extracting the boundary lines from the multi-dimensional image;

counting the number of boundary pixels of the color region and the number of pixels in the color region immediately adjacent to the color region; and calculating a ratio based on the number of boundary pixels of the color region and the number of pixels in the color region immediately adjacent to the color region to determine the complexity between the color regions.

42. The computer software product as claimed in claim 38, wherein the merging color regions using hierarchical cluster analysis further comprises:

calculating the features of each color region;

calculate threshold values based on the feature calculation of the color regions;

merge color regions based on the region feature distance using a nearest neighbor analysis;

calculate threshold values of the merged color regions; and merge color regions based on the region feature distance using a furthest neighbor analysis.

43. The computer software product as claimed in claim 38, wherein assigning region data to each color region further comprises assigning at least one visual feature to each color region.

44. The computer software product as claimed in claim 43, wherein assigning visual features to each color region further comprises assigning at least one of a dominant color descriptor, a color layout descriptor, a shape descriptor or an edge histogram descriptor for each color region.

45. The computer software product as claimed in claim 38, wherein assigning region data to each color region further comprises assigning at least one of a keyword, a tag or an identifier name to each color region.

* * * * *